United States Patent
Fuller et al.

(10) Patent No.: US 8,789,408 B2
(45) Date of Patent: Jul. 29, 2014

(54) SYSTEMS AND METHODS FOR HOLDING TARGET TURBOMACHINE COMPRESSOR PRESSURE RATIO CONSTANT WHILE VARYING SHAFT SPEED

(71) Applicant: General Electric Company, Schenectady, NY (US)

(72) Inventors: Jason Dean Fuller, Greenville, SC (US); Daniel Richard Waugh, Greenville, SC (US); Justin Aaron Allen, Greenville, SC (US); Brian Allen Rittenhouse, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/673,192

(22) Filed: Nov. 9, 2012

(65) Prior Publication Data
US 2014/0130584 A1 May 15, 2014

(51) Int. Cl.
*G01M 15/00* (2006.01)
(52) U.S. Cl.
USPC .................................................. 73/112.01

(58) Field of Classification Search
USPC .......................................... 73/114.16, 112.01
See application file for complete search history.

(56) References Cited

U.S. PATENT DOCUMENTS

| | | | |
|---|---|---|---|
| 6,364,602 B1 * | 4/2002 | Andrew et al. | 415/1 |
| 7,076,940 B2 * | 7/2006 | Hirayama et al. | 60/39.27 |
| 7,117,662 B2 * | 10/2006 | Hirayama et al. | 60/39.27 |
| 7,762,084 B2 * | 7/2010 | Martis et al. | 60/792 |
| 7,946,310 B2 | 5/2011 | Maillard et al. | |
| 8,311,684 B2 * | 11/2012 | Riverin | 700/301 |
| 2006/0201132 A1 * | 9/2006 | Hirayama et al. | 60/39.27 |
| 2007/0203669 A1 * | 8/2007 | Hayashi | 702/185 |
| 2008/0019842 A1 * | 1/2008 | Coates et al. | 417/2 |
| 2010/0152918 A1 * | 6/2010 | Riverin | 700/301 |

* cited by examiner

*Primary Examiner* — Freddie Kirkland, III
(74) *Attorney, Agent, or Firm* — Sutherland Asbill & Brennan LLP

(57) ABSTRACT

Embodiments of the disclosure relate to systems and methods for holding target turbomachine compressor pressure ratio constant while varying the shaft speed. In order to characterize a load compressor and validate the compressor design, the speed of the load compressor can be changed while controlling the compressor operating line and holding the inlet guide vanes at a constant angle. Discharge control valves can be dynamically adjusted to maintain the pressure ratio equal to the operating line over a range of speeds.

17 Claims, 5 Drawing Sheets

SYSTEMS AND METHODS FOR HOLDING TARGET TURBOMACHINE COMPRESSOR PRESSURE RATIO CONSTANT WHILE VARYING SHAFT SPEED

TECHNICAL FIELD

This disclosure generally relates to turbomachines, and in particular to systems and methods for holding a target turbomachine compressor pressure ratio constant while varying the shaft speed.

BACKGROUND

Turbomachinery transfers energy between a rotor and a fluid. In a turbomachine, like an axial compressor, the discharge pressure of the compressor will typically vary with the shaft speed. Ambient air, as a working fluid, enters an inlet of a compressor and rotation of the compressor blades compresses the working fluid. As the compressor speed slows down, the discharge pressure of that compressor generally will go down. Likewise, as the compressor speeds up, the discharge pressure increases.

BRIEF DESCRIPTION OF THE DISCLOSURE

Embodiments are disclosed for systems and methods for holding a target turbomachine compressor ratio constant while varying the shaft speed. Certain embodiments can be used for targeting a specific pressure ratio across an axial compressor during transient speed operations of the compressor. In certain instances, this capability can enable data to be gathered on the compressor at a constant operating line even with significant variations in speed.

In an embodiment, a method for testing a load compressor can be provided. The method can include coupling the load compressor to an axial shaft, wherein the axial shaft is operable to be rotated over a wide range of speeds. The method can further include holding inlet guide vanes, coupled to the load compressor, at a set angle. In addition, the method can include varying a speed of the axial shaft over a test speed range. The method can also include controlling pressure ratio to an operating line over the test speed range by using a discharge control valve that can be dynamically positioned to adjust the outlet pressure.

In another embodiment, a system for testing a load compressor can be provided. The system can include an axial shaft, coupled to the load compressor, operable to be rotated over a wide range of speeds, wherein the axial shaft is varied over a test speed range. The system can also include inlet guide vanes, coupled to the load compressor, wherein the inlet guide vanes are held at a set angle. The system can also include a controller for controlling a pressure ratio to an operating line over the test speed range. The inlet guide vanes can be held at a plurality of differing set angles.

In yet another embodiment, a system for testing a load compressor can be provided. The system can include at least one controller in communication with a plurality of sensors associated with the load compressor. The at least one controller can be operable to receive a plurality of inlet pressure measurements from the plurality of sensors. The at least one controller can also be operable to receive a plurality of outlet pressure measurements from the plurality of sensors. The at least one controller can be further operable to determine a pressure ratio based upon the plurality of inlet pressure measurements and the plurality of outlet pressure measurements.

In addition, the at least one controller can be operable to control the pressure ratio to an operating line over the test speed range.

Other embodiments, systems, methods, features, and aspects of the disclosure will become apparent from the following description taken in conjunction with the following drawings.

These implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION OF THE DISCLOSURE

Certain embodiments of the disclosure can enable the ability to control an operating limit line during transient speed operation to allow for complete mapping of new compressor products for gas turbines as well as complete gas turbine validation. To fully characterize the load compressor and validate the compressor design, the speed of the load compressor can be changed while holding the compressor operating line and inlet guide vanes constant, which is at least one technical effect or solution of certain embodiments of the disclosure. In order to control to a compressor operating line, the pressure ratio across the load compressor can be scheduled based on the speed and the inlet guide vane angle.

Figure 1:
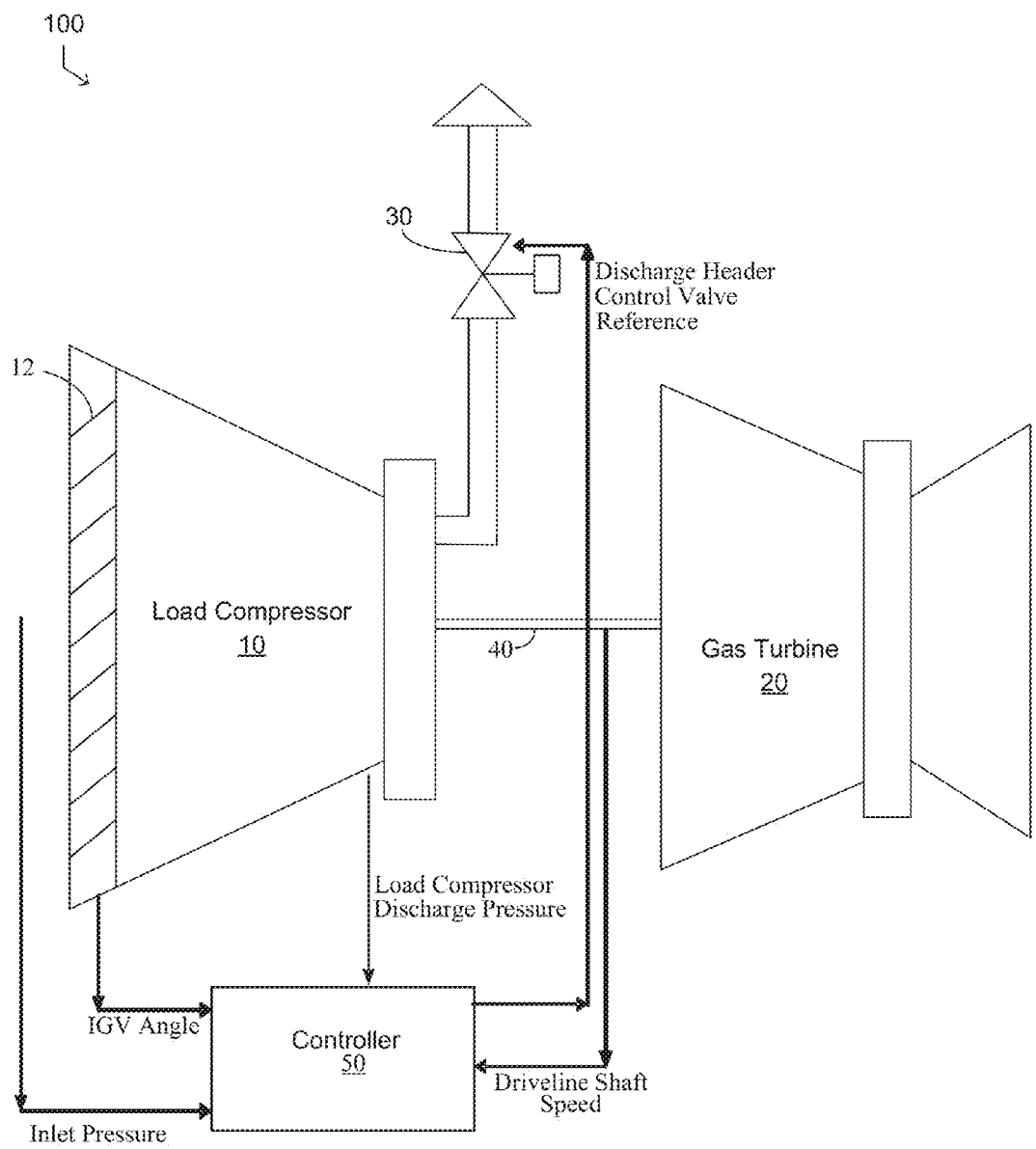
FIG. 1 is a schematic representation of an example compressor testing system according to an embodiment of the disclosure.

Referring to FIG. 1 of the drawings, illustrated is a schematic representation of a compressor testing system 100 according to an example embodiment. During compressor testing, a gas turbine 20 can be coupled to the load compressor 10 as shown. The gas turbine 20 can control the speed of the load compressor 10 while inlet guide vanes (IGVs) 12 and the discharge header control valves 30 control the load and operation of the load compressor 10. To fully characterize the load compressor 10 and validate the compressor design, the speed of the load compressor 10 may be varied while holding the inlet guide vanes 12 constant.

Sensors can detect the load compressor speed, the inlet pressure, and the discharge pressure. The pressure ratio across the load compressor 10 can be calculated from the inlet and discharge pressures. A control algorithm may use a predetermined compressor pressure ratio setpoint to position a discharge header control valve 30. As the discharge header control valve 30 is opened, the discharge pressure of the load compressor 10 may drop. Closing the discharge header control valve 30 can increase the pressure ratio across the load compressor 10. As the speed of the axial load compressor shaft 40 changes, the airflow through the load compressor 10 may change. With no changes to the discharge header control valve 30 position, the pressure ratio across the load compressor 10 may vary with speed. The controller 50 may automatically position the discharge header control valve 30 to maintain the pressure ratio across the machine even when the speed of the axial load compressor shaft 40 is changing, which is at least one technical effect or solution of certain embodiments of the disclosure.

The system 100 described above with reference to FIG. 1 is provided by way of example only. As desired, a wide variety of other embodiments, systems, components, and methods may be utilized to maintain the pressure ratio equal to the operating line during a speed sweep or over a speed range.

Figure 2:
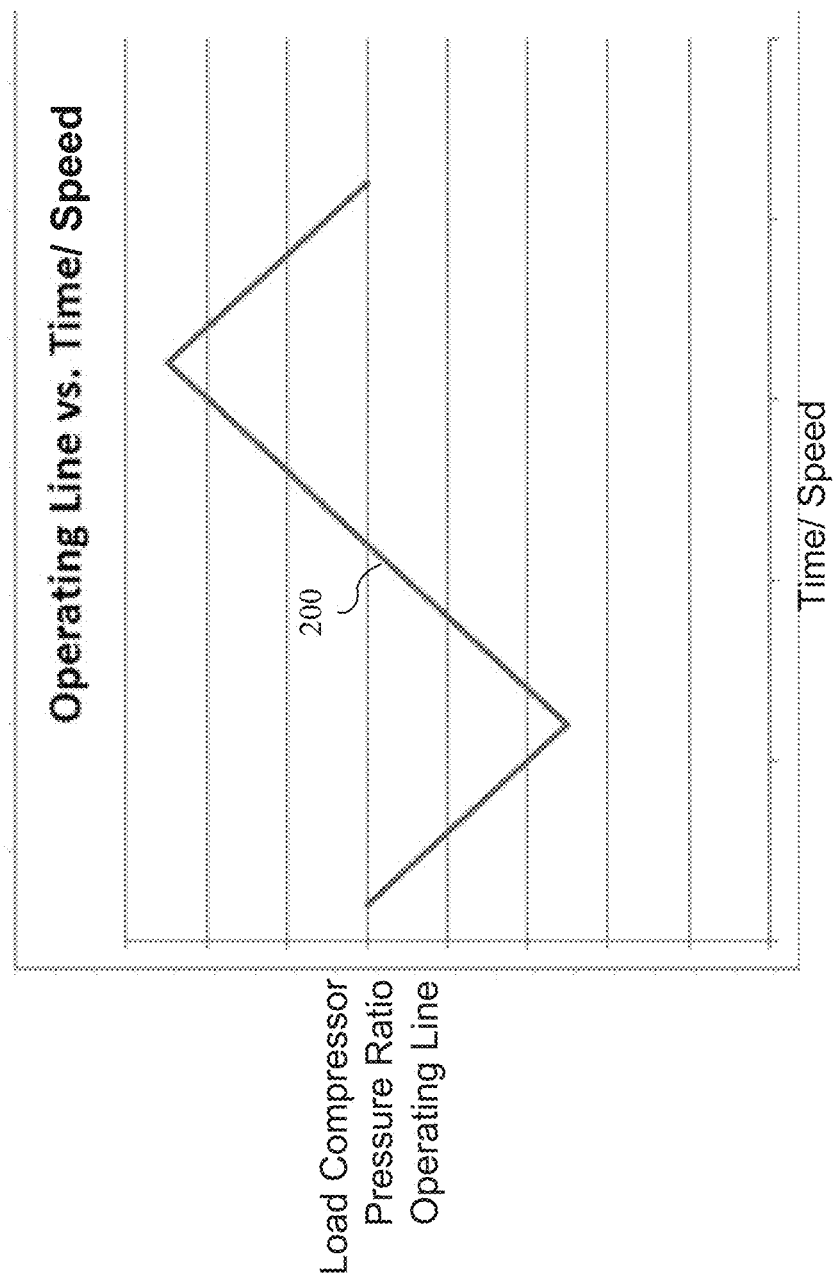
FIG. 2 is a graphical representation of an example schedule showing the dynamic operating line during a speed sweep test in accordance with an embodiment of the disclosure.

FIG. 2 illustrates a graphical representation of an example schedule showing the dynamic operating line 200 during a speed sweep test in accordance with an embodiment of the disclosure. As illustrated, a compressor can be held on the dynamic operating line as speed changes for a specific IVG angle. The operating line 200 can change as a result of the shaft speed changing, and the discharge valves may be opened or closed to maintain the pressure ratio to the operating line, which is at least one technical effect or solution of certain embodiments of the disclosure.

As illustrated, a compressor may be operating at 100% speed with IGVs at a set angle. The associated operating line is shown at the beginning of the speed sweep. In this example, when the compressor speed is reduced, the IGVs are still at the same angle, but now the operating line is lower because of the decreased speed. Continuing with the example, when the compressor speed is increased, the IGVs are still the same at the same open angle, but now the operating line is higher because of the increased speed.

At least one feature of a speed sweep test is to be able to test the compressor over a wide speed range on both sides of the normal operating speed. This configuration may control to an operating line 200. As the speed changes, the operating line 200 can change as a result of the shaft speed moving. There may be a different exit pressure associated with the increment in speed. However, the compressor may be held on the dynamic operating line 200 as speed moves. The discharge valve position can be opened or closed dynamically to maintain the pressure ratio to the operating line, which is at least one technical effect or solution of certain embodiments of the disclosure. Accordingly, speed can be at least one changing variable for the speed sweep. The test can be performed transiently such that compressor responses and airflow responses can be quickly determined.

Figure 3:
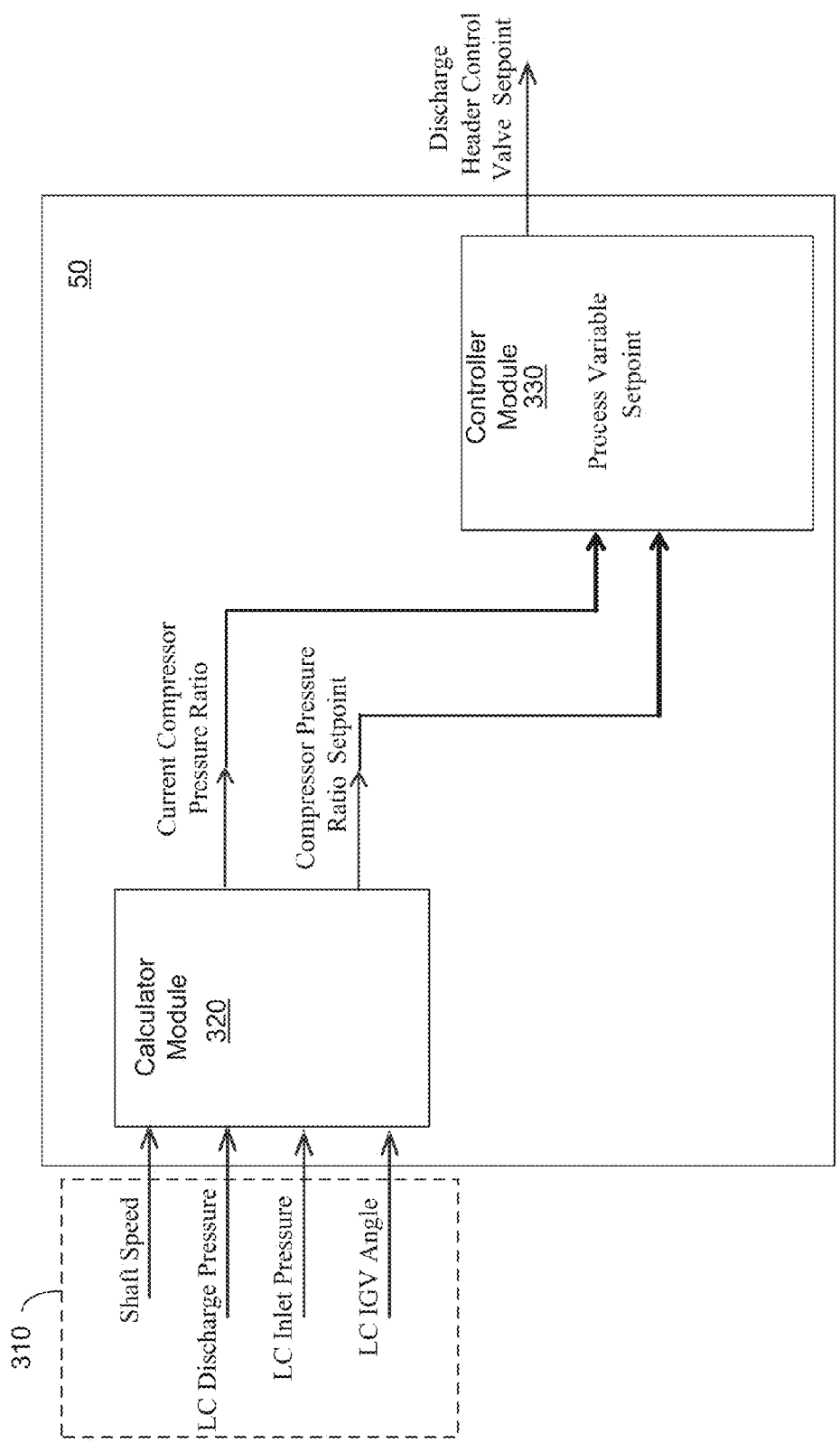
FIG. 3 is an exemplary logic diagram of a compressor testing system controller in accordance with an embodiment of the disclosure.

FIG. 3 illustrates, by way of an exemplary logic diagram 300, a compressor testing system controller 50 in accordance with an embodiment of the disclosure. During a speed sweep test, a controller 50 may continuously monitor various parameters 310 pertaining to a load compressor. The load compressor IGV angle may be set to a specific target. The IGV angle and the drive line speed can be used to set an operating line target, which may be calculated by a calculator module 320. The speed sweep test may transition the shaft speed from the normal 100% operating speed to faster and slower speeds. A schedule based on the IGV angle and speed can be dynamically scheduled by the calculator module 320, such that when the speed moves, the calculator module 320 can determine a new limit line.

For example, a speed sweep test may transition the shaft speed above and below the normal operating speed. The speed of the shaft can be controlled by a gas turbine and determined by the controller 50. The controller 50 can also continuously monitor the inlet and discharge pressures. A calculator module 320 can calculate the pressure ratio by dividing the discharged pressure by the inlet pressure and determine the desired compressor pressure ratio set point. During the speed sweep, as the shaft speed varies, a controller module 330 can constantly adjust the discharge header control valve set point in order to dynamically control the discharge header control valve to maintain the compressor pressure ratio set point, which is at least one technical effect or solution of certain embodiments of the disclosure. For example, a set point may be 20 and the process variable, determined by a feedback loop, may determine that it is 19. In this instance, the controller 50 may determine that the process variable is lower than the set point, and may close the discharge valves to make the process variable or feedback equal to the set point. The discharge valves can close to bring pressure up and can open to bring pressure down. The controller 50 can change the speed of the drive line and at the same time change the area on the discharge of a load compressor using discharge control valves to maintain that constant pressure ratio.

The IGV angles may be changed between each sweep, but will not typically be changed during a sweep. For example, in order to cover the entire design space in the compressor, the IGVs on the compressor may be changed between about 0% and about 100% open in any desired increments. In this example, a sweep for an IGV angle of about 0% open can set a certain operating line on the compressor. The speed sweep test may be performed on that operating line between a minimum and maximum speed. Next a speed sweep may be performed at about 10% IGV angle with a new operating limit line based on that IGV angle. The speed sweeps may be performed at varying IGV angles all the way up to about 100% open to fully characterize the compressor at different IGV angles. The operating line can change based on each IGV angle. A chart of the operating line may show a plurality of curves of the operating line based on each IGV angle. Accordingly, this testing may schedule the operating line across the load compressor based on the IGV angle.

Accordingly, in order to hold a compressor operating line, the pressure ratio across the load compressor can be scheduled based on the speed and the inlet guide vane angle. The speed of the load compressor can be changed while maintaining the compressor operating line and holding the inlet guide vanes constant to fully characterize the load compressor and validate the compressor design, which is at least one technical effect or solution of certain embodiments of the disclosure.

The logic system 300 described above with reference to FIG. 3 is provided by way of example only. As desired, a wide variety of other embodiments, systems, components, and methods may be utilized to maintain the pressure ratio equal to the operating line during a speed sweep or over a speed range.

Figure 4:
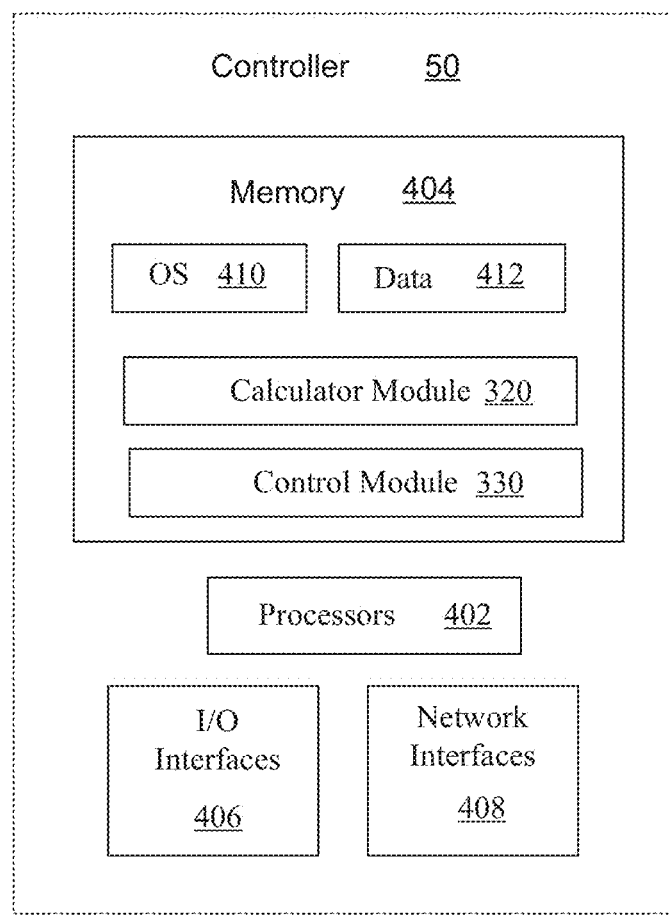
FIG. 4 is a block diagram of an example compressor testing system controller in accordance with an embodiment of the disclosure.

FIG. 4 illustrates, by way of a block diagram, an example compressor testing system controller 50 in accordance with an embodiment of the disclosure. The controller 50 may comprise one or more processors 402, one or more memories 404, one or more input/output ("I/O") interfaces 406, and one or more network interfaces 408. The controller 50 may include other devices not depicted.

The processor 402 may include one or more cores and is configured to access and execute at least in part instructions stored in the one or more memories 404. The one or more memories 404 can include one or more computer-readable storage media ("CRSM"). The one or more memories 404 may include, but are not limited to, random access memory ("RAM"), flash RAM, magnetic media, optical media, and so forth. The one or more memories 404 may be volatile in that information is retained while providing power or non-volatile in that information is retained without providing power.

The one or more I/O interfaces 406 may also be provided in the controller 50. These I/O interfaces 406 allow for coupling devices such as sensors, keyboards, mice, monitors, printers, external memories, and the like.

The one or more network interfaces 408 may provide for the transfer of data between the controller 50 and another device directly such as in a peer-to-peer fashion, via a network, or both. The network interfaces 408 may include, but are not limited to, personal area networks ("PANs"), wired local area networks ("LANs"), wide area networks ("WANs"), wireless local area networks ("WLANs"), wireless wide area networks ("WWANs"), and so forth. The network interfaces 408 may utilize acoustic, radio frequency, optical, or other signals to exchange data between the controller 50 and another device such as a smart phone, an access point, a host computer, and the like.

The one or more memories 404 may store instructions or modules for execution by the processor 402 to perform certain actions or functions. The following modules are included by way of illustration, and not as a limitation. Furthermore, while the modules are depicted as stored in the memory 404, in some implementations, these modules may be stored at least in part in external memory which is accessible to the controller 50 via the network interfaces 408 or the I/O interfaces 406. These modules may include an operating system ("O/S") module 410 configured to manage hardware resources such as the I/O interfaces 406 and provide various services to applications or modules executing on the processor 402.

A calculator module 320 may be stored in the memory 404. The calculator module 320 may be configured to continuously acquire sensor data from the one or more input devices. The calculator module 320 can calculate the pressure ratio by dividing the discharged pressure by the inlet pressure and determine the desired compressor pressure ratio set point. A schedule based on the IGV angle and speed may be dynamically scheduled by the calculator module 320 such that when the speed moves, the calculator module 320 can calculate a new limit line. The calculator module 320 may store the data and schedules in a datastore 412.

A controller module 330 may be configured to maintain the pressure ratio equal to the operating line during a speed sweep or over a speed range. During the speed sweep, the controller module 330 can be operable to constantly adjust the discharge header control valve set point in order to dynamically control the discharge header control valve to control the compressor pressure ratio to the operating line, which is at least one technical effect or solution of certain embodiments of the disclosure. The controller module 330 may store the data and the set points in the datastore 412.

The controller 50 described above with reference to FIG. 4 is provided by way of example only. As desired, numerous other embodiments, systems, methods, apparatus, and components may be utilized to maintain the pressure ratio equal to the operating line over the speed range.

Figure 5:
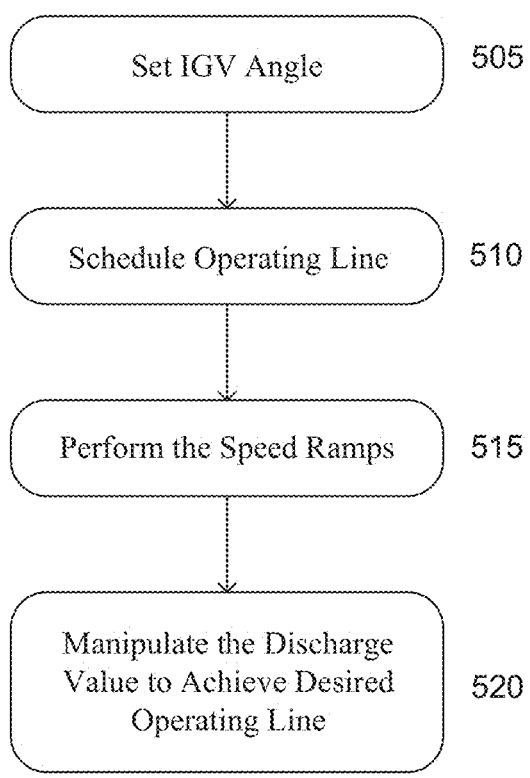
FIG. 5 is a flow diagram illustrating an example method for maintaining pressure ratio equal to the operating line during a speed sweep in accordance with an embodiment of the disclosure.

FIG. 5 illustrates by way of a flow diagram illustrating an example method for maintaining the pressure ratio equal to the operating line during a speed sweep in accordance with an embodiment of the disclosure. The method 500 may start in block 505.

In block 505, the IGV angle can be set for that specific speed sweep. For example, the IGV might be set for about 100% open, about 50% open, about 75% open, or any other angle. During a speed sweep, the IGV angle may be held constant as the speed varies.

In block 510, a schedule may be used to determine the operating line. The results of the IGV angle and the drive line speed may set an operating line target. As the shaft speed varies, a controller may constantly adjust the discharge header control valve to maintain the pressure ratio set point.

In block 515, the speed sweep may begin. During the speed ramps, data may be gathered continuously. For example, a speed sweep may start at about 100% speed and then start ramping down to a minimum speed. Then, the speeds may turn around and ramp up to a maximum speed then go back to about 100%. Typically, the speed sweep can be tested in a continuous ramp with a constant rate of acceleration or deceleration through the range.

In block 520, the discharge value can be manipulated to achieve the desired operating line. During the speed sweep, sensors may continuously gather data. Sensors may detect the load compressor speed, the inlet pressure, and the discharge pressure. The pressure ratio across the machine can be calculated from the inlet and discharge pressures. A control algorithm can use a pre-determined compressor pressure ratio set point to position a discharge header control valve. As the discharge header control valve is opened, the discharge pressure of the machine drops. Closing the discharge header control valve can increase the pressure ratio across the compressor. As the speed of the axial load compressor shaft changes, the airflow through the load compressor may change. With no changes to the discharge header control valve, the pressure ratio across the load compressor can vary with speed. The discharge header control valve can be automatically adjusted to maintain the pressure ratio across the machine when the shaft speed is changing.

A loop can exist as the speed ramps. Sensor data can be continuously gathered and the discharge valve discharge can be constantly adjusted to maintain the desired target operating line. As soon as the speed moves, the operating line can be continuously calculated for that speed at that moment of time. As the speed moves, the sensors can be reporting back the current pressure ratio. As the current pressure ratio is compared to the target, there can be feedback, and the discharge valves can respond appropriately to maintain the pressure ratio equal to the target.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by processor-executable program instructions. Likewise, some blocks of the block diagrams and flow diagrams may not necessarily need to be performed in the order presented, or may not necessarily need to be performed at all, according to some implementations.

These processor-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

The invention claimed is:

1. A method for testing a load compressor, the method comprising:
   coupling a gas turbine to the load compressor via an axial shaft, wherein the gas turbine comprises a first compressor, a combustor, and a turbine, and wherein the axial shaft is operable to be rotated over a wide range of speeds;
   holding inlet guide vanes, coupled to the load compressor, at a set angle;
   varying speed of the axial shaft over a test speed range; and
   controlling pressure ratio of the load compressor to an operating line over the test speed range.

2. The method of claim 1, further comprising:
   determining a pressure ratio target;
   sensing an inlet pressure and an outlet pressure of the load compressor; and
   adjusting the outlet pressure to control the pressure ratio to the pressure ratio target.

3. The method of claim 2, wherein the operation of adjusting the outlet pressure comprises:
   dynamically adjusting a discharge control valve.

4. The method of claim 1, wherein the gas turbine is operable to rotate the axial shaft over the test speed range.

5. The method of claim 1, further comprising:
   changing the set angle of the inlet guide vanes to a new set angle;
   varying the speed of the axial shaft over the test speed range at the new set angle; and
   controlling the pressure ratio to a new operating line over the speed range at the new set angle.

6. A system for testing a load compressor, comprising:
   a gas turbine coupled to an axial shaft, wherein the gas turbine comprises a first compressor, a combustor, and a turbine;
   the axial shaft, coupled to the load compressor, operable to be rotated over a wide range of speeds, wherein the axial shaft is varied over a test speed range;
   inlet guide vanes, coupled to the load compressor, wherein the inlet guide vanes are held at a set angle; and
   a controller operable to control a pressure ratio across the load compressor to an operating line over the test speed range.

7. The system of claim 6, wherein the controller is coupled to an inlet pressure sensor and an outlet pressure sensor.

8. The system of claim 7, wherein the controller is operable to determine a pressure ratio target.

9. The system of claim 8, further comprising a discharge control valve, coupled to the controller, operable to control the pressure ratio to the pressure ratio target.

10. The system of claim 6, wherein the inlet guide vanes are operable to be held at a plurality of differing set angles.

11. The system of claim 10, wherein the inlet guide vanes are held at a new set angle while
   varying the speed of the axial shaft over the test speed range at the new set angle.

12. The system of claim 11, wherein the controller is operable to control the pressure ratio to the new operating line over the speed range at the new set angle.

13. The system of claim 6, wherein the gas turbine is operable to rotate the axial shaft over the test speed range.

14. A system for testing a load compressor, comprising:
   at least one controller in communication with a plurality of sensors associated with the load compressor coupled to a gas turbine comprising a first compressor, a combustor, and a turbine, wherein the at least one controller is operable to:
      receive a plurality of inlet pressure measurements from the plurality of sensors;
      receive a plurality of outlet pressure measurements from the plurality of sensors;
      determine a pressure ratio based upon the plurality of inlet pressure measurements and the plurality of outlet pressure measurements; and
      control the pressure ratio of the load compressor to an operating line over the test speed range.

15. The system of claim 14, wherein the gas turbine is operable to rotate an axial shaft over the test speed range.

16. The system of claim 15, wherein the controller is operable to set a rotation speed of the axial shaft.

17. The system of claim 14, wherein the controller is operable to provide a signal to a discharge control valve.

* * * * *